US010445586B2

(12) United States Patent
Sinha et al.

(10) Patent No.: US 10,445,586 B2
(45) Date of Patent: Oct. 15, 2019

(54) DEEP LEARNING ON IMAGE FRAMES TO GENERATE A SUMMARY

(71) Applicant: Microsoft Technology Licensing, LLC, Redmond, WA (US)

(72) Inventors: Utkarsh Sinha, Bellevue, WA (US); Kandarpkumar J. Makwana, Seattle, WA (US); Melissa Regalia, Seattle, WA (US); Wei-Chih Chen, Tainan (TW); Joshua B. Weisberg, Redmond, WA (US); Baoyuan Wang, Sammamish, WA (US); Gil M. Nahmias, Seattle, WA (US); Noranart Vesdapunt, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 46 days.

(21) Appl. No.: 15/923,175

(22) Filed: Mar. 16, 2018

(65) Prior Publication Data
US 2019/0180109 A1    Jun. 13, 2019

Related U.S. Application Data

(60) Provisional application No. 62/597,734, filed on Dec. 12, 2017.

(51) Int. Cl.
| | | |
|---|---|---|
| G06K 9/00 | (2006.01) | |
| H04N 21/8549 | (2011.01) | |
| G06K 9/66 | (2006.01) | |
| G06K 9/62 | (2006.01) | |
| H04N 21/414 | (2011.01) | |
| H04N 21/4223 | (2011.01) | |
| H04N 21/44 | (2011.01) | |
| H04N 21/4788 | (2011.01) | |

(52) U.S. Cl.
CPC ..... *G06K 9/00751* (2013.01); *G06K 9/00718* (2013.01); *G06K 9/6215* (2013.01); *G06K 9/6232* (2013.01); *G06K 9/66* (2013.01); *H04N 21/41407* (2013.01); *H04N 21/4223* (2013.01); *H04N 21/44008* (2013.01); *H04N 21/4788* (2013.01); *H04N 21/8549* (2013.01)

(58) Field of Classification Search
CPC ............ G06K 9/00751; G06K 9/6232; G06K 9/6215; G06K 9/66; G06K 9/00718; H04N 21/4788; H04N 21/44008; H04N 21/4223; H04N 21/41407; H04N 21/8549
See application file for complete search history.

(56) References Cited

U.S. PATENT DOCUMENTS

| | | | |
|---|---|---|---|
| 7,120,873 B2 | 10/2006 | Li | |
| 7,372,991 B2 | 5/2008 | Chen et al. | |

(Continued)

OTHER PUBLICATIONS

"International Search Report & Written Opinion Issued in PCT Patent Application No. PCT/US2018/063948", dated Mar. 6, 2019, 17 Pages.

(Continued)

*Primary Examiner* — Phuoc Tran
(74) *Attorney, Agent, or Firm* — Drinker Biddle & Reath LLP (57) ABSTRACT

Techniques for automatically selecting image frames from a video and providing the selected image frames to a device for display are disclosed.

11 Claims, 9 Drawing Sheets

(56) References Cited

U.S. PATENT DOCUMENTS

| | | |
|---|---|---|
| 8,243,203 B2 | 8/2012 | Suh |
| 8,699,806 B2 | 4/2014 | Yagnik |
| 9,591,181 B2 | 3/2017 | Cunningham |
| 2006/0059120 A1 | 3/2006 | Xiong et al. |
| 2013/0142418 A1 | 6/2013 | van Zwol et al. |
| 2013/0279881 A1* | 10/2013 | Lu .......................... H04N 5/91 386/241 |
| 2014/0072285 A1* | 3/2014 | Shynar ................. G11B 27/031 386/286 |
| 2016/0070962 A1 | 3/2016 | Shetty et al. |
| 2016/0292510 A1 | 10/2016 | Han et al. |
| 2017/0065888 A1 | 3/2017 | Cheng |
| 2017/0065889 A1 | 3/2017 | Cheng |
| 2017/0109584 A1 | 4/2017 | Yao et al. |

OTHER PUBLICATIONS

Vermaak, et al., "Rapid Summarisation and Browsing of Video Sequences", In Proceedings of the 13th British Machine Vision Conference, Sep. 2-5, 2002, 10 Pages.

"Comic Book Style Video Summarization Technology (Manga)", Retrieved from: https://www.fujixerox.com/eng/company/technology/communication/multimedia/manga.html, Retrieved on: Dec. 6, 2017, 2 pages.

Guironnet, et al., "Video Summarization Based on Camera Motion and a Subjective Evaluation Method", In Journal on Image and Video Processing, Apr. 30, 2007, pp. 1-26.

* cited by examiner

DEEP LEARNING ON IMAGE FRAMES TO GENERATE A SUMMARY

CROSS-REFERENCE TO RELATED APPLICATIONS

This application claims the benefit of U.S. provisional application 62/597,734 filed on Dec. 12, 2017, the entire contents of which is incorporated herein by reference in its entirety.

FIELD OF THE DISCLOSURE

The present disclosure relates generally to techniques for selecting and/or providing images for display from a sequence of image frames in a video.

BACKGROUND

Smartphones and portable electronic devices regularly contain digital cameras that are cable of capturing digital media, including image and video, at various resolutions. In some instances, a user may elect to capture an event using video instead of individual pictures, for example, to avoid (1) the possibility of missing a critical moment at an event, (2) inadvertently capturing a blurry image of the event, or (3) capturing an image in which one or more individuals have an awkward pose. Accordingly, many users may capture short videos of less than five minutes in length.

More recently, via social media users can share images and/or video that is styled or modified in some way. For example, users may desire to adjust color, add text, add icons, etc. to the digital media captured by the user's device. Such modifications of digital media are typically performed via a digital media or photo-sharing application operating on the smartphone or portable electronic device (e.g., a tablet, watch, laptop, etc.). Such an application may allow users to upload and share digital media content with other individuals such as via the Internet or a social media account. Often times a user would like to efficiently select the best images for display or to share. Further, some users may wish to tell a story with a select number of images from a video, or to have images of a video presented in the form of a summary or comic strip. Deciding which images to select can be time consuming when there are many images to select from such as video. Thus, a process to efficiently select the best images of a video on a smartphone or other portable electronic device is needed.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Disclosed are implementations to identify one or more frames of a video that are suitable for highlighting the video and/or distinct. Such one or more frames may be provided to the user in the form of a video summary in which one or more frames are presented on a screen of a mobile device at once (e.g., a comic strip) or in sequence on the mobile device. The selected one or more frames may be provided to a digital media or photo-sharing application that may allow a user to modify the images such as by adding text, applying a filter, and/or adding other icons to the one or more selected frames. The one or more frames of the video may correspond to a video summary, that may provide an indication of the content of a video such as the events that occurred in the video. The disclosed implementations may select one or more frames from a video by a combination of deep learning techniques and heuristic frame suppression to guide the final selection of frames to desired ground truth. The disclosed frame suppression may include, for example, a similarity distance between two or more selected frames, and/or neighbor suppression based on a predefined frame suppression curve.

The disclosed implementations can utilize a machine learning algorithm to identify one or more image frames from a video that may be of high quality or interest. One issue with selecting one or more frames from a video is that there is not enough labeled data available to train a machine learning algorithm. For example, in an ideal situation, in video summarization, there would be millions of different videos and a human would annotate each of frame of the videos to indicate which frames of the video are the most desirable. Undertaking such a feat is both time consuming and expensive. Label data for a video may refer to an indication of whether a particular video frame is desirable. For example, the frame may show individuals in a particular pose or with their eyes open, a fountain at a high point, be sharp (as opposed to blurry), and/or other high level human features that may be desirable. Collecting such label data from a video would require searching through every single video frame to identify those frames which have the best combination of features to make them desirable for relative to other frames in the video. The techniques disclosed herein can utilize a best of burst feature, which utilizes only a relatively small number of labelled images in the burst. The disclosed techniques can operate in real-time on a mobile device such as a smartphone, and the trained model can be small. For example, the trained model can be approximately 100 KB in size.

Figure 1:
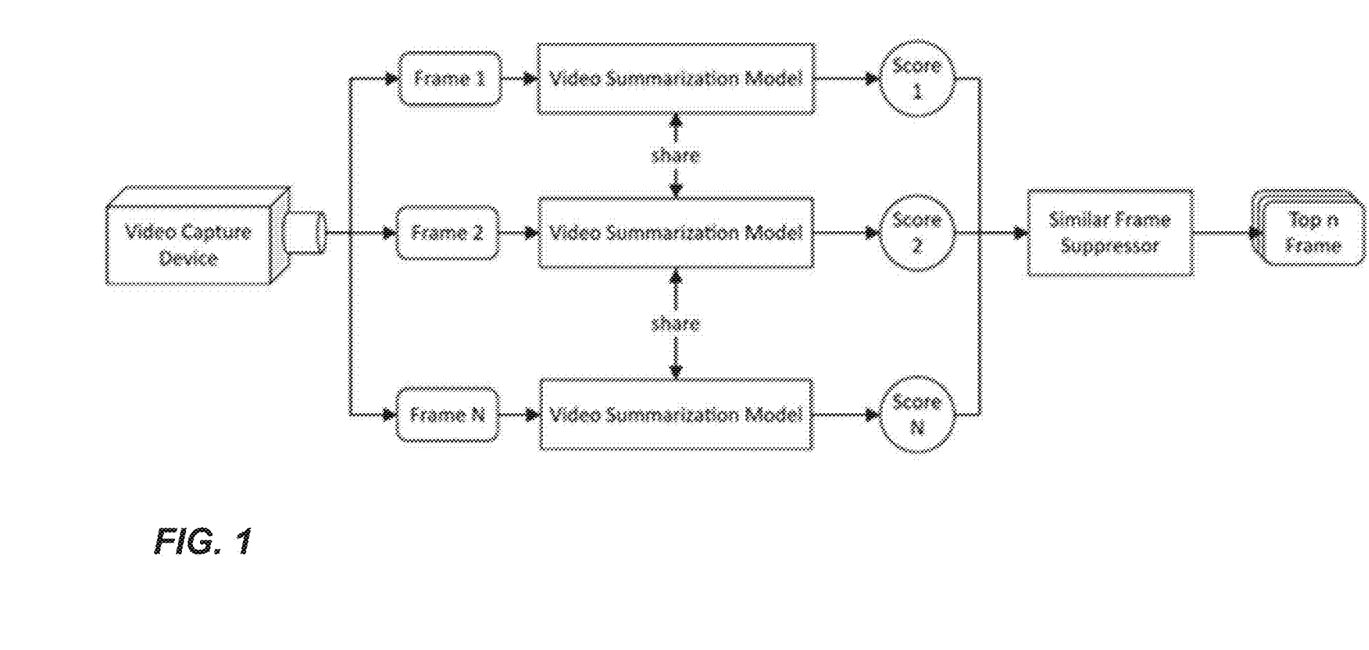
FIG. 1 is an example overview of the process to generate the top N frames from a video that are suitable or desirable according to an implementation disclosed herein.

FIG. 1 is an example overview of the process to generate the top N frames that are suitable or desirable from a given video. As shown in FIG. 1, a video capture device, such as a camera in a smartphone, may obtain video that is made up of a sequence of individual frames. The video may be broken down into frames, and each frame may be analyzed by the video summarization model one frame at a time. The video summarization model may refer to a model developed by training a machine learning algorithm on a labelled data set, which is described below. Machine learning algorithms can include a supervised algorithm, such as logistic regression, naïve Bayes, and/or linear discriminant analysis. The present disclosure is not limited to any particular machine learning algorithm. The video summarization model may be shared among every frame that is input into the model to minimize the model size, and allow for easier parallel computing. The output of the video summarization may be a score for each frame input into the system, as illustrated in FIG. 1. The scores output for each of the frames may ranked and/or processed according to distance similarity and the applied suppression curve as explained below. These features can ensure the uniqueness of the top N frame(s).

A burst capture may refer to situation where a series of digital images are captured in a relatively short period of time such as 10 ms, 20 ms, and/or less than 1 s. While a burst capture typically has fewer than 100 images, a relatively short video may have thousands of image frames, and there is not a lot of change from one frame relative to the immediately neighboring frames in most situations. A video containing thousands of frames, therefore, may be reduced to a problem of the best of several input images rather than labelling the entire number of video frames that make up a given video or, in other words, the best of burst image capture. That is, according to an implementation disclosed herein, a few frames of the video may be input into the video summarization model illustrated in FIG. 1, rather than all frames in the video. The few frames that are selected for such input analysis from a given video may be conceptualized as a burst of images. From the burst of images that are used as input material for the video summarization model, one or more best images can be selected.

To reduce the total number of frames in a video, a heuristic is employed. The heuristic approach can set the frames per second for the video. For example, if a video has a time, t, then the video may be interpolated to have a frame rate of z. For example, if the video is less than one minute in length, the frame rate of the video may be sampled or set to 5 fps. If the video is between 1 and 5 minutes, the frame rate may be set to be between 2 and 5 fps depending on the device hardware and/or as configured by the user or application provider. If the video is longer than 5 minutes, the frame rate may be set to 2 fps. By reducing the frame rate in this manner, it may avoid causing the device to heat up and/or slow down, as well as decrease the processing time. The reduced processing time can be advantageous when the selected image frames according to FIG. 1 are provided to a photo-sharing application. In general, most users do not wish to wait to begin manipulating a photo or sharing a photo. Thus, the reduced processing time can greatly improve the user experience as well as the performance of the device.

Figure 2:
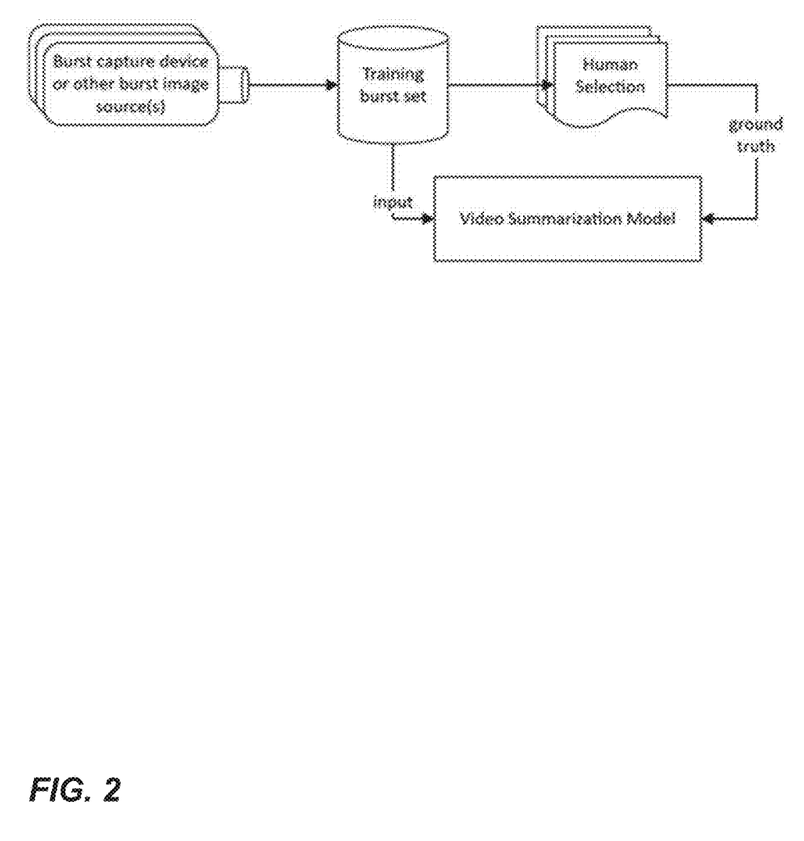
FIG. 2 is an example overview of the training of the video summarization model according to an implementation disclosed herein.

FIG. 2 provides an example overview of the training of the video summarization model. The model may be based on a machine learning algorithm such as a regression model, a classification model, etc. The learning algorithm can find patterns in the training data and map the input data attributes to a target data set (e.g., a data set that is not part of the training data set). The model can be trained by applying the machine learning algorithm to a training dataset of image frames. The training dataset may also be evaluated by human scorers, as explained below, so that every image in the training set has label data available. The human-scored label data can be referred to as ground truth to train or correct the model.

Figure 3:
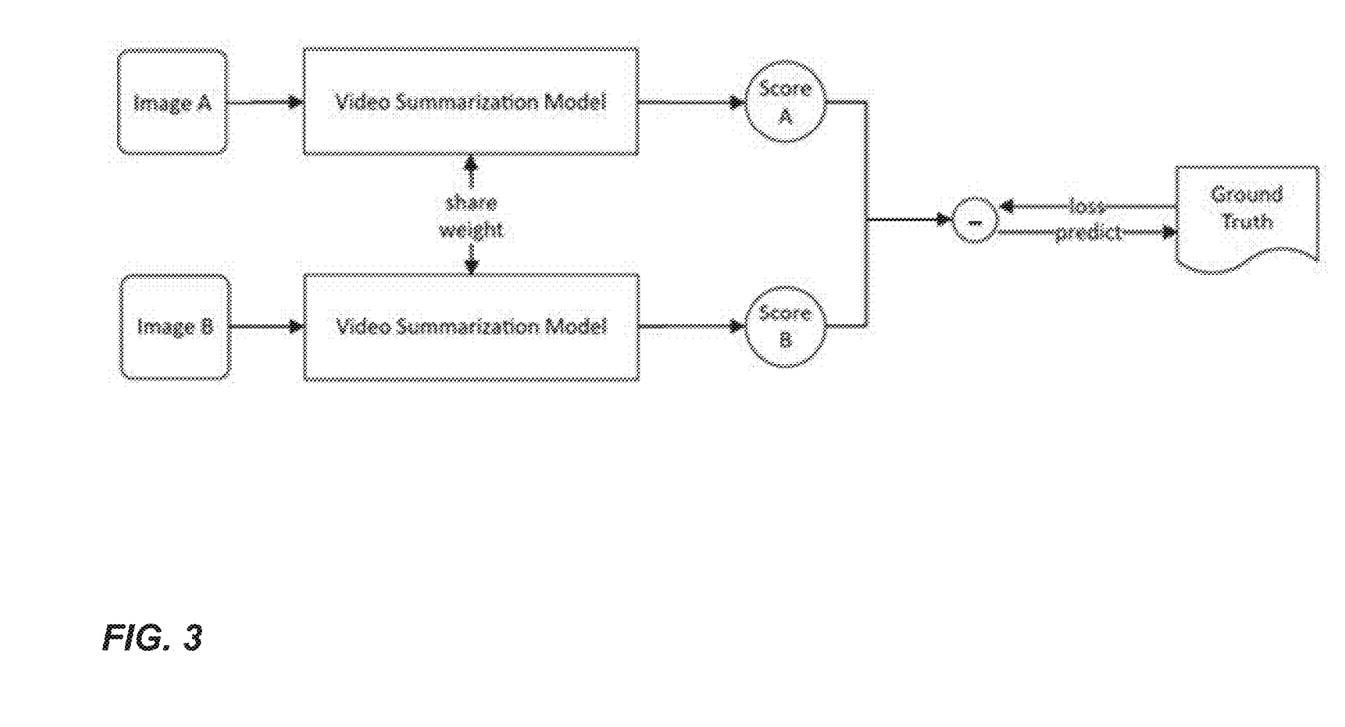
FIG. 3 is an example of the process to train the video summarization model according to an implementation disclosed herein.

FIG. 3 provides an example of the process to train the video summarization model. In FIG. 3, there are two images input, image A and image B. These images may be considered image pairs that a human scorer may judge. The human scorer may indicate whether image A is better compared to image B. Such pairwise comparisons are made for all images in the training set (e.g., image A compared to image C, image A compared to image n, image B compared to image C, etc.). A probability may be assigned to each case as follows: A>B may be a probability of 1.0; A=B may be a probability of 0.5; and A<B may be a probability of 0. Each pairwise comparison may be scored by multiple human scorers. If A>B, then a score output by the model for A-B should be positive and vice versa. Thus, even though images may be being evaluated independently, the scores may be relative to one another. The probabilities can be utilized to train or correct the machine learning algorithm. For example, the sum of the pairwise comparisons for A and B for human scorers may be used to indicate that a particular image is better than another image according to the human scorers. As an example, a majority of human scorers may indicate that image A is a better image as compared to image B. This evaluation may be based on various subjective qualities that the majority of human scorers appear to agree upon. The machine learning algorithm may be trained on a data set that includes the images that were scored by the human scorers (e.g., the image frames have label data). In some configurations, the machine learning algorithm may be trained on a dataset that includes image frames having the highest probability of being a good image (e.g., the image is more often than not selected as being the better image in pairwise comparisons) to identify features associated with desirable images. Similarly, the algorithm may be trained to select against certain features by training it on the least desirable images based upon the pairwise comparisons.

As illustrated in FIG. 3, the model may output a score for each image in the training dataset (or a subset thereof). The scores for each image pair can be subtracted to compute the difference between them, and then processed through a Sigmoid function, which can be corrected by the ground truth probability. A sigmoid cross entropy loss function may be applied to back propagate the loss into the deep network architecture as below:

$$\text{Loss} = \frac{-1}{n} \sum_{i=1}^{n} p_i \, \log(\hat{p}_i) + (1 - p_i) \, \log(1 - \hat{p}_i) \qquad \text{Equation 1}$$

In Equation 1, n is the number of images in the batch, $p_i$ is a deep network prediction, and $\hat{p}_i$ may be ground truth. The scores for image frames A and B in FIG. 3 might be, for example, 5000 and 4000, respectively. The sigmoid function may compress or normalize those scores to be in a range of 0 to 1. If A is better than B, then Equation 1 may output the score as 1 or close to 1.

Figure 4:
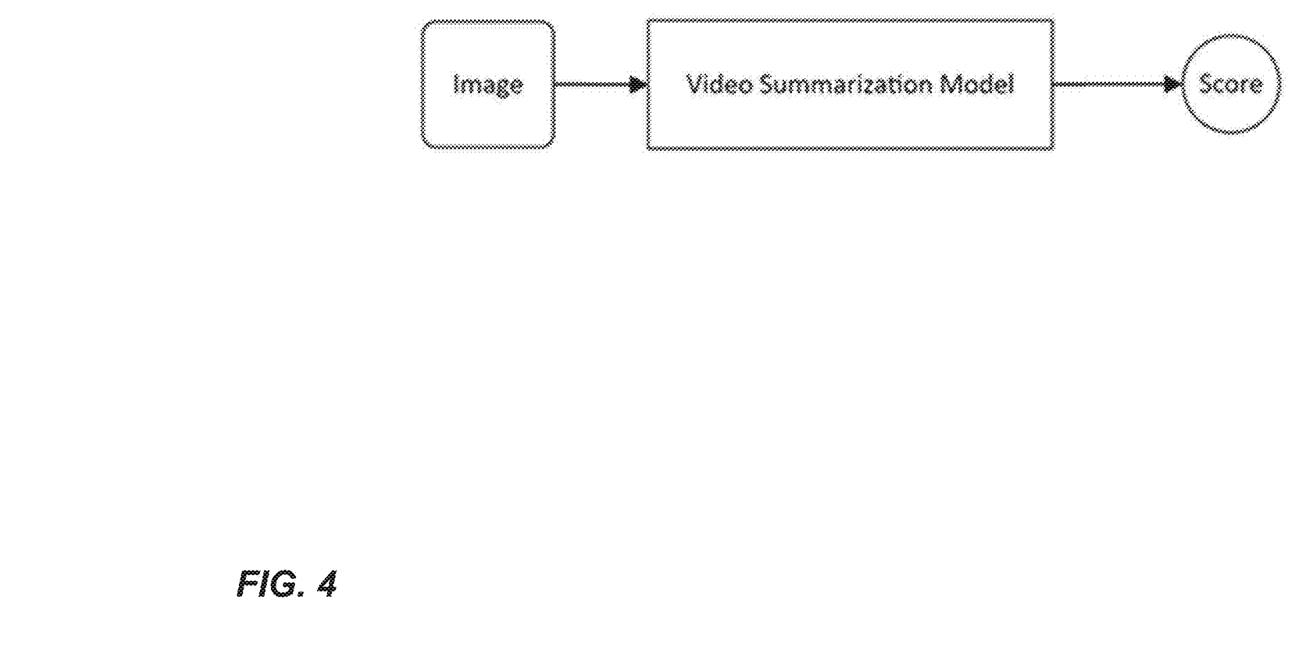
FIG. 4 is an example of the best of burst pipeline according to an implementation disclosed herein.

Since the deep network produces a score, as illustrated in FIG. 4, prior to subtraction and Sigmoid normalization, the score of each image may preserve the relative ranking property. Accordingly, the comparison between each image is preserved. The scores may be utilized as the raw scores which can be directly used to roughly estimate the top N frames from a video.

Even though the score from best of burst can provide a preliminary top N frames selection, it may not have the temporal information within the video. The temporal information (e.g., sequence of frames of a video) may be provided as a part of the metadata associated with each frame such as in the form of a frame index. As a consequence of the above-described scoring, the temporal sequence of the frames may not be provided to the video summarization model for scoring. Selected frames of a video that are near to one another in the sequence of the video may be expected to have similarly high scores since little may change from one frame as compared to its nearest neighbors in the sequence of the video. Thus, one issue with the above-described scoring process by the video summarization model is that it can select similar top frames because all of these frames may have high best of burst scores. Accordingly, temporal information may be incorporated into the process as well to suppress similar frames.

Figure 5:
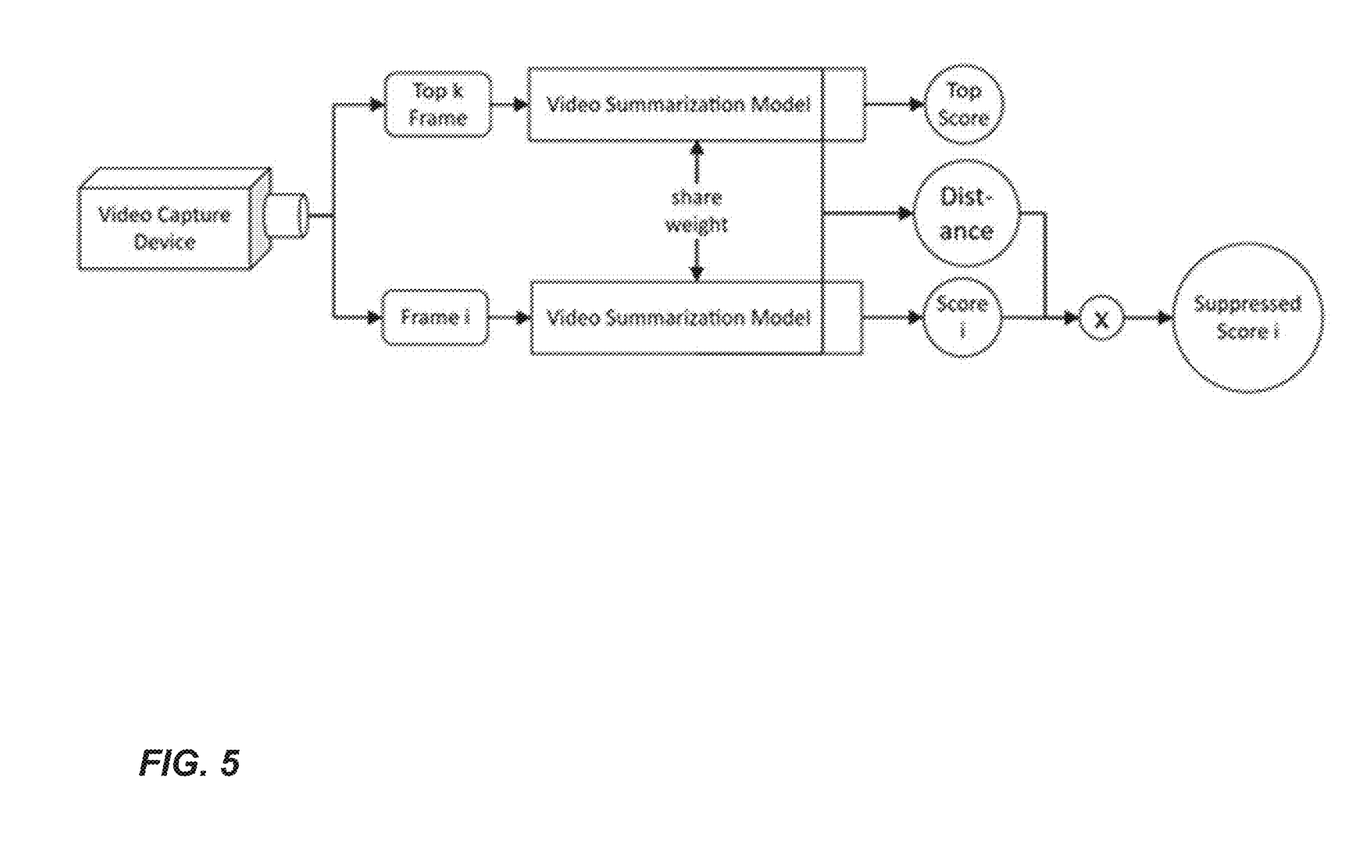
FIG. 5 is an example of the similarity distance computation to generate a suppression score according to an implementation disclosed herein.

One option to address the issue of having similar frames is to perform a pairwise image comparison. However, because the resolution of an image can be large (e.g., high definition or 4K resolution), performing a pairwise image comparison would be time consuming, heat the user's device, and may even cause the user's device to crash because, for example, it may have insufficient memory to perform the computations. Another option is to resize the image, but this would requiring resizing the image to a relatively low resolution, which loses too much information. Instead, as disclosed herein, similar frames to the selected frames may be suppressed by computing an image distance. Features obtained from the video summarization model, which is small in size, may be utilized to perform the distance computation. The features obtained from the video summarization model can represent the image in an abstract manner such as whether the image is blurry or sharp, indicate a specific human pose, eyes are open or closed, etc., which can be utilized to estimate the difference between frames. An example of this process is illustrated in FIG. 5.

The scores obtained from the testing process illustrated in FIG. 1 may be ranked. The distance between the feature vectors that describe the top frame and all other frames for which a score has been obtained may be computed. The score of the other frame may be multiplied by the distance computed between the other frame and the top ranked frame. If frame (i) is significantly different from top frame, the similarity distance will be high, and therefore, the score will be increased. On the other hand, if frame (i) is similar to top frame, the similarity distance will be low, and it will decrease the chance of being pick as the top frame.

Image distance can be computed in Euclidean distance as the distance operator. For example, each image frame may be described by the video summarization model by a feature vector. The sharpness of an image may have a value of 3, while the eyes open or closed feature may have a value of 2 for a first image. A second image may have a feature vector with values of 1 and 5 for blur/sharpness and eyes open/closed. A feature vector may have hundreds or more features. A Euclidean distance between the first and second image for the above example vectors may be computed as $(3-1)^2+(2-5)^2=13$. The number 13 may be used as the multiplier of the score of the second image if the first image was the top ranked image, to generate a suppression score. In some instances, the Euclidean distance may be 0, which may essentially reduce the chance that a frame multiplied by 0 can be selected as a top frame.

The similarity distance computation may begin with the top-ranked image frame according to the score output by the video summarization model shown in FIG. 1. A distance between the top ranked frame and every other frame may be computed based upon the feature vectors that describe the image frames. In come configurations, a threshold may be applied prior to this computation. For example, only video frames having a threshold score value (e.g., a score above 1000) may be utilized for subsequent analysis and/or inclusion in the image output to a user or selection for display to the user. In some configurations the threshold may be based on a number of images (e.g., only the top 100 frames may be selected for further analysis).

The similarity distance computation may be based upon a comparison of feature vectors that describe each of the individual image frames according to the video summarization model. As an example, based upon raw scores, frames may be ordered from top to bottom as frame 1 (F1) having a score of 1000, frame 2 (F2) having a score of 600, frame 3 (F3) having a score of 500, and frame 4 (F4) having a score of 200. The distance between the F1 and F2 may be 0, the distance between F1 and F3 may be 3, and the distance between F1 and F4 may be 20. Accordingly, the scores of F2, F3, and F4 may be multiplied by the respective distance to yield suppression scores as F2=600×0=0, F3=500×3=1500, and F4=200×5=1000. In some configurations, images that fall below a threshold score value may be removed from further consideration because these images may be deemed to be too similar to the top scoring image. For example, frames with a suppression score less than 250 may be excluded from further analysis. In some instances the threshold may be relative to the top score. For example, if the top score is 5000, then a threshold cutoff may be established that is 10% of the top score value. Continuing the above example, F4 and F3 may be ranked as the next best image frames based upon the computed suppression scores.

Figure 6:
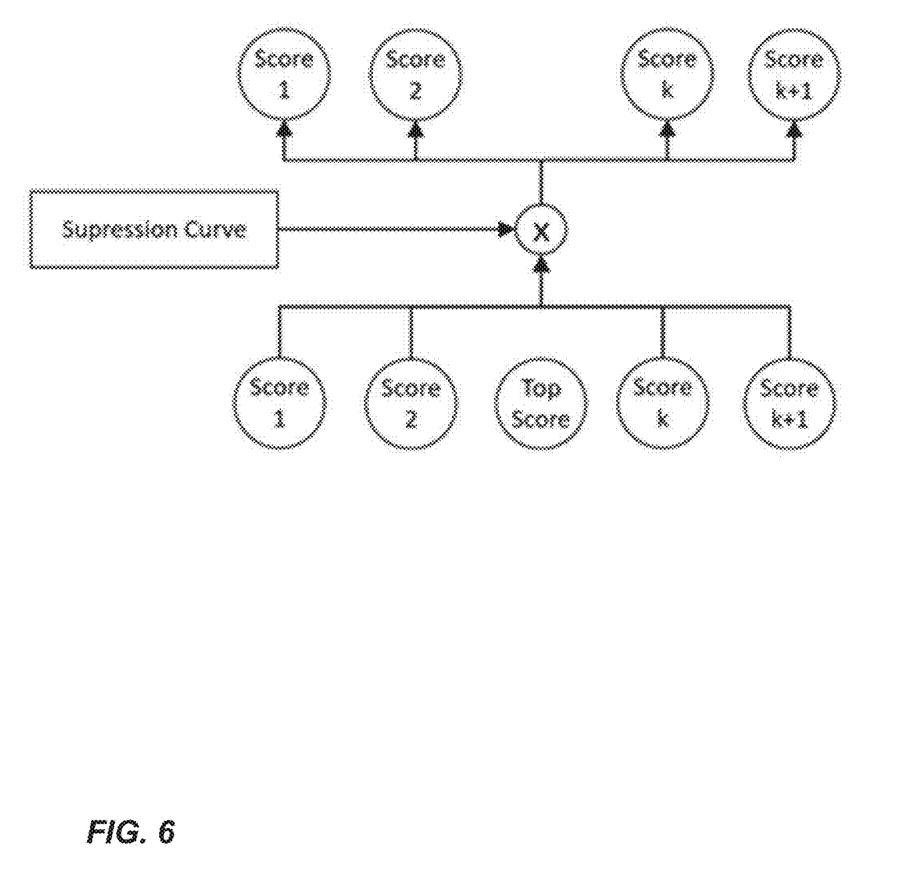
FIG. 6 is an example overview of how neighbored frames of the selected top frame are suppressed by applying a suppression curve according to an implementation disclosed herein.

FIG. 6 is an example overview of how neighbored frames of the selected top frame are suppressed. Neighbored frames may be similar to the selected top frame because the window of time for changing features of a given frame to the next frame in sequence is relatively small. For instance, a fast action short can have different frames within a 10 ms timeframe. A suppression curve may be generated as an absolute curve where the minimum is 0, and maximum is 1. The shape of the curve may be configured to be linear, parabolic, and/or non-linear. The previously selected top frame may be the center of the curve, and the first neighbored frame may be excluded or have a significantly decreased possibility of being selected because its score may be multiplied by 0. On the other hand, a different highly-ranked frame may be further away (e.g., in time or video sequence) because the score of the frame may be multiplied by 1). The suppression scores obtained from the similarity distance calculation may be multiplied by the suppression curve. The frames may be ranked again and the frame with the highest overall score may be determined to be the final top frame. The identified top frame may then be removed and the process may be iterated until the next top frame is identified. For example, in a subsequent iteration, the curve may be centered about the next top image frame, thereby causing neighboring frames to have a decreased score.

As an example, the top score from the above-discussed example was F1. F1 may be centered on the suppression curve. Although F4 may have been identified as being the next best frame after F1 based upon the similarity distance calculation, the score for F4 may be suppressed because it is too close to F1. Accordingly, the score of F4 may be suppressed, which can cause it to no longer be the next best frame. Instead, a different frame may be selected, such as frame 5 (F5). The process may then iterate on the computed scores for the suppression curve.

Once a specified number of frames are selected or a threshold number of frames are obtained, the system may display or otherwise present such images on the device of the user. In some configurations, the process may not terminate until every frame has been ranked or there are no frames remaining to be ranked by the suppression curve computation. In some instances, the number of images to be selected can be function of the size of a video. For example, a 1 minute video may only select the four top image frames, while a 5 minute value may select the top 15 image frames. Other criteria may be utilized to determine the number of frames to be displayed and/or when to cease iterating the video of interest. For example, if there are no frames above a certain threshold minimum raw score, suppression score, suppression score (i.e., based upon the similarity distance calculation), and/or score based upon the suppression curve. The selected images may be simultaneously displayed on the user device such as in a comic strip format. Since the time index for each image frame can be retained, the images can be presented in sequence. The images may be provided to a digital media application operating on the device of the user. The application may allow the user to manipulate each image individually, or as they appear together on the screen of the user's device (e.g., in comic strip format). For example, a user may desire to add a text bubble to the images.

Figure 7:
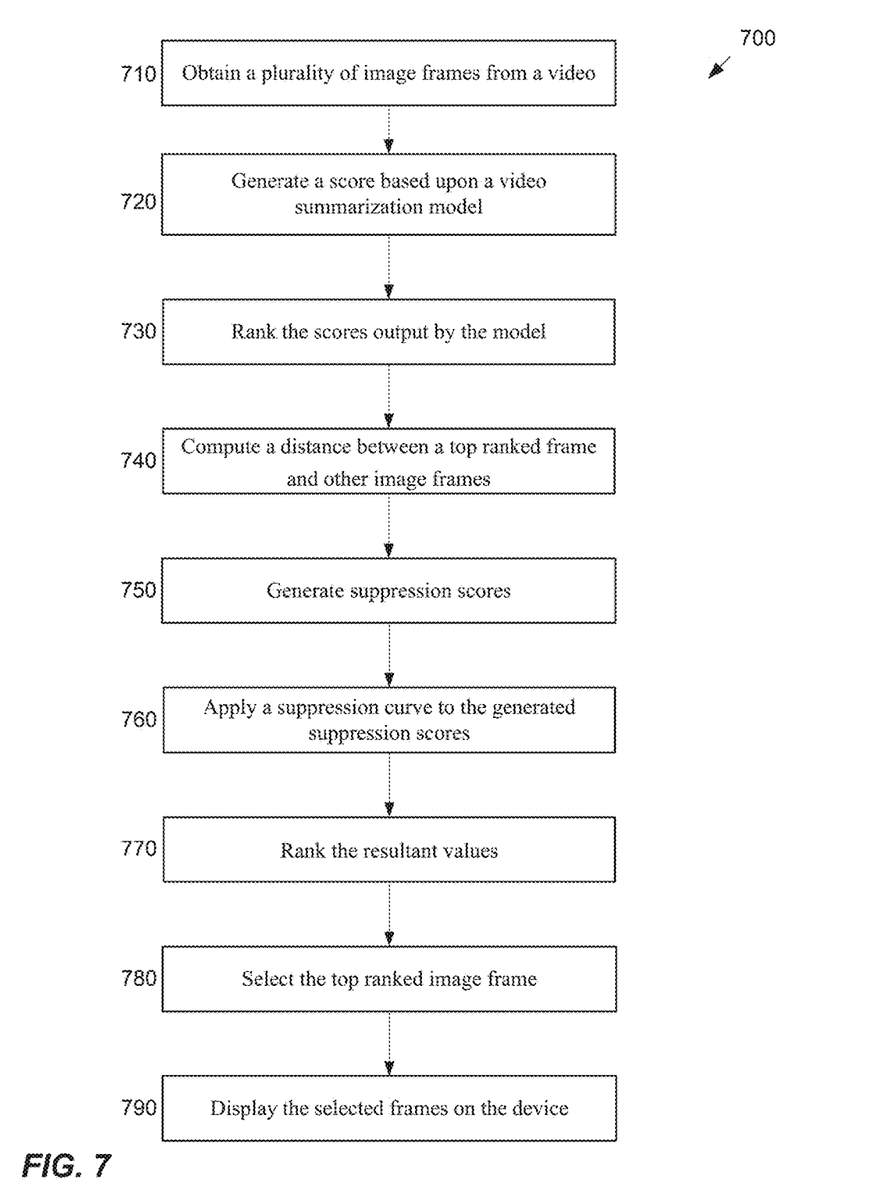
FIG. 7 is an example is an example of the process for scoring image frames by the model, computing distance, and applying a suppressor curve according to an implementation disclosed herein.

FIG. 7 is an example of the disclosed process for scoring image frames by the model, computing distance, and applying a suppressor curve. The disclosed functions may be stored, for example, on a computer readable medium that are read by a processor as a series of instructions.

Figure 8:
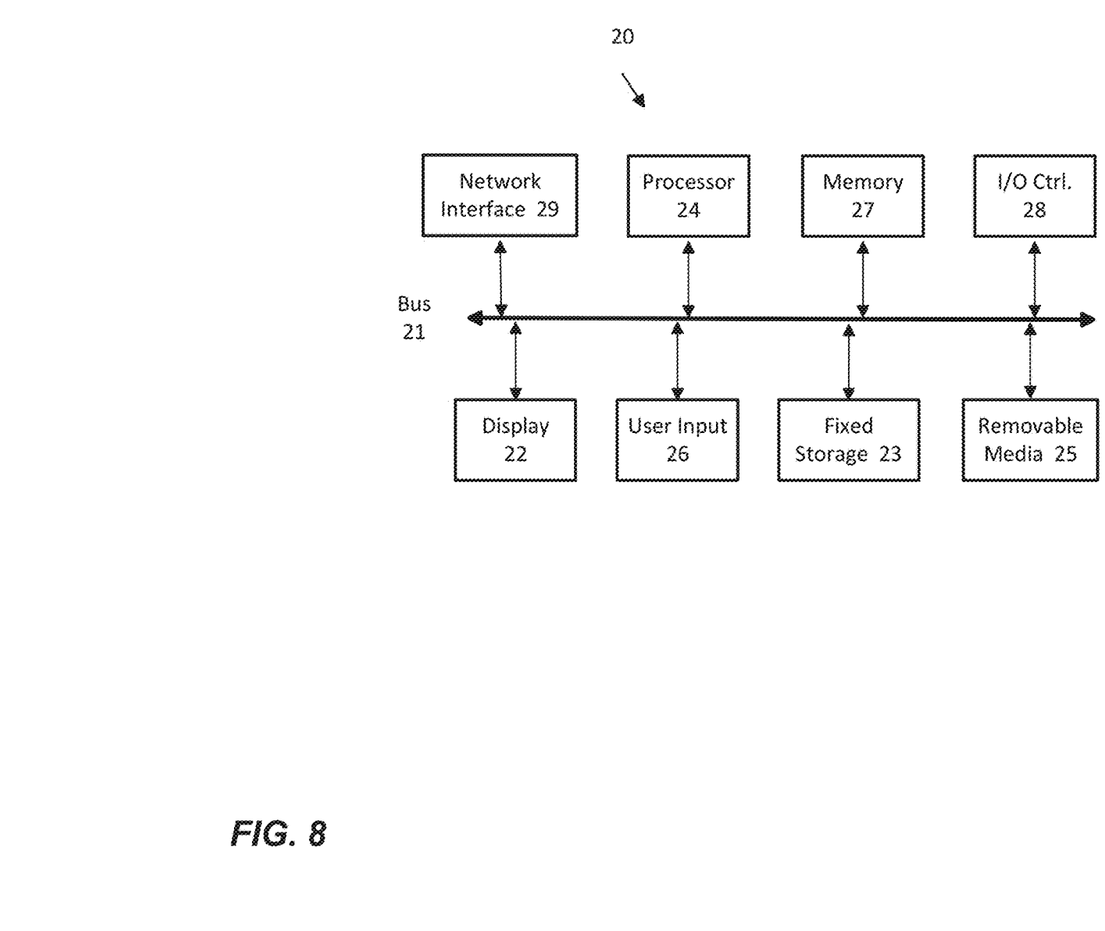
FIG. 8 is an example computer suitable for implementing embodiments of the presently disclosed subject matter.

Embodiments of the presently disclosed subject matter may be implemented in and used with a variety of component and network architectures. FIG. 8 is an example computer 20 (e.g., electronic device such as a smartphone, tablet, laptop, personal computer, etc.) suitable for implementing embodiments of the presently disclosed subject matter. The computer 20 includes a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
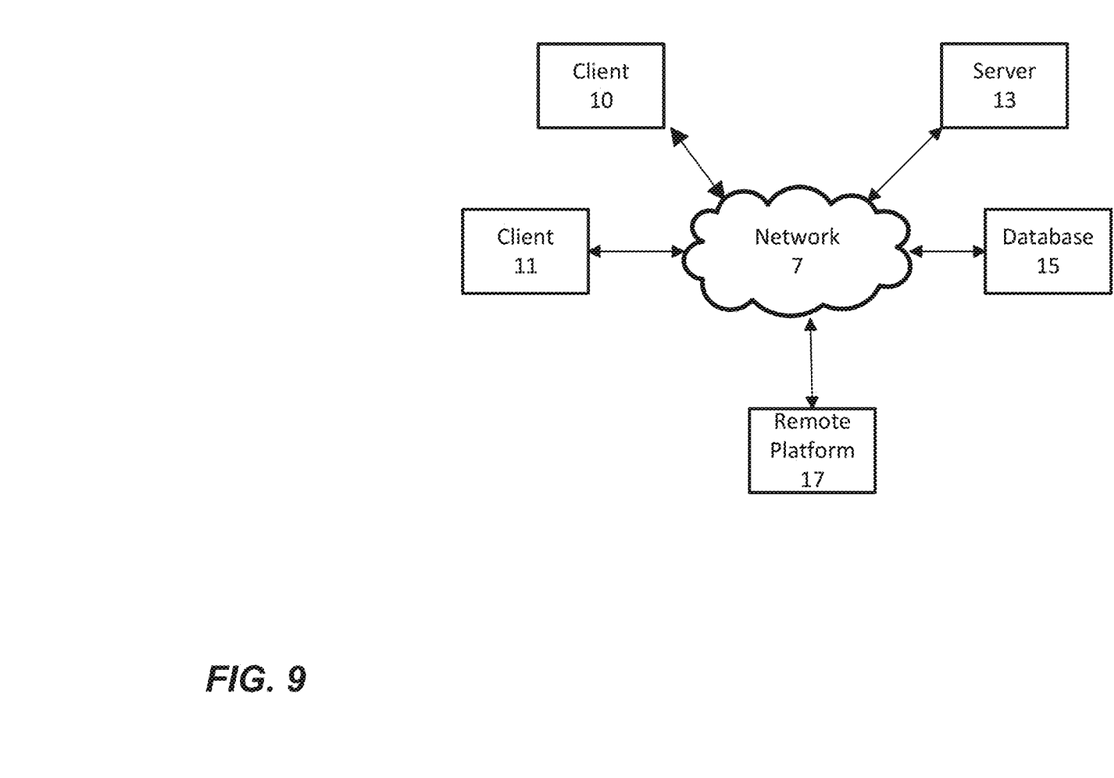
FIG. 9 shows an example network arrangement according to an embodiment of the disclosed subject matter.

FIG. 9 shows an example network arrangement according to an embodiment of the disclosed subject matter. One or more clients 10, 11, such as local computers, smartphones, tablet computing devices, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
   at least one non-transitory memory storing instructions;
   one or more hardware processors that are coupled to the at least one non-transitory memory and that are configured to execute the instructions to cause the system to perform operations comprising:
      obtain a plurality of image frames from a video;
      generate a score for each of the plurality of image frames of the video based upon a video summarization model;
      rank the score for each of the plurality of image frames to generate a ranking;
      compute a distance between a top ranked frame from the ranking and each other frame of the plurality of image frames;
      generate suppression scores based upon the distance computation;
      apply a suppression curve to the generated suppression scores to minimize a likelihood that one of the plurality of image frames proximal to the top ranked frame is selected, wherein the suppression scores for the each other frame of the plurality of image frames are multiplied by a value corresponding to the suppression curve;
      after applying the suppression curve to the suppression scores, rank the resultant values to identify a next top ranked image frame;
      select the top ranked image frame and the next top ranked image frame for display on a device; and
      display the top ranked image frame and the next top ranked image frame on the device.

2. The system of claim 1, wherein the operations further comprise:
   iteratively applying the suppression curve to the each other frame of the plurality of image frames, ranking a next resultant values, and selecting a third ranked image frame, wherein any frame selected as a highest ranking frame is excluded from subsequent iterations.

3. The system of claim 1, wherein the device performs the operations and the device is selected from the group consisting of a smartphone, a smartwatch, a tablet, a laptop computer.

4. The system of claim 1, wherein the operations further comprise training a video summarization model by:
   obtain a training set of image frames;
   obtain ground truth information for each of the training set of image frames, the ground truth information comprising:
      a pairwise comparison between each possible pair of image frames in the training set of image frames;
      generate a probability for the pairwise comparison to form ground truth information;
   apply a machine learning algorithm to the training set of image frames to produce a score for each image in the training set of image frames;
   compute a difference between scores obtained for each pair of image frames in the training set of image frames;
   apply a normalization function to the difference to generate a normalized difference value;
   compare the normalized difference value to the ground truth for each pair of images to ascertain incorrect and correct predictions by the machine learning algorithm; and
   provide an indication to the machine learning algorithm of the incorrect and correct predictions to train the machine learning algorithm to generate the video summarization model.

5. The system of claim 1, wherein the operations further comprise:
   displaying the top ranked image frame and the next top ranked image frame in a comic strip format.

6. The system of claim 1, wherein the operations further comprise:
   providing the top ranked image frame and the next top ranked image frame to a photo-sharing application operating on the device; and
   receiving, by the photo-sharing application operating on the device, one or more modifications to the top ranked image frame and the next top ranked image frame.

7. The system of claim 6, wherein the operations further comprise:
   wherein the one or more modifications is selected from the group consisting of: adding text, adding an icon, adding a geometric shape or line, and applying an image filter.

8. The system of claim 1, wherein the suppression curve is an absolute curve and has the top ranked frame centered at a minimum value of 0.

9. The system of claim 1, wherein the operations further comprise:
   reducing the frame rate of the video, wherein the plurality of images are obtained from the reduced frame rate video.

10. A computer-implemented method, comprising:

obtaining a plurality of image frames from a video;

generating a score for each of the plurality of image frames of the video based upon a video summarization model;

ranking the score for each of the plurality of image frames to generate a ranking;

computing a distance between a top ranked frame from the ranking and each other frame of the plurality of image frames to generate suppression scores;

applying a suppression curve to the generated suppression scores to minimize a likelihood that one of the plurality of image frames proximal to the top ranked frame is selected, wherein the suppression scores for the each other frame of the plurality of image frames are multiplied by a value corresponding to the suppression curve;

after applying the suppression curve to the suppression scores, ranking the resultant values to identify a next top ranked image frame;

selecting the top ranked image frame and the next top ranked image frame for display on a device; and displaying the top ranked image frame and the next top ranked image frame on the device.

11. A non-transitory computer readable medium having stored thereon computer readable instructions that are executable to cause one or more processors to perform operations, comprising:

obtaining a plurality of image frames from a video;

generating a score for each of the plurality of image frames of the video based upon a video summarization model;

ranking the score for each of the plurality of image frames to generate a ranking;

computing a distance between a top ranked frame from the ranking and each other frame of the plurality of image frames to generate suppression scores;

applying a suppression curve to the generated suppression scores to minimize a likelihood that one of the plurality of image frames proximal to the top ranked frame is selected, wherein the suppression scores for the each other frame of the plurality of image frames are multiplied by a value corresponding to the suppression curve;

after applying the suppression curve to the suppression scores, ranking the resultant values to identify a next top ranked image frame;

selecting the top ranked image frame and the next top ranked image frame for display on a device; and displaying the top ranked image frame and the next top ranked image frame on the device.

* * * * *